United States Patent
Li (10) Patent No.: US 10,254,724 B2
(45) Date of Patent: Apr. 9, 2019

(54) METHOD AND SYSTEM FOR PERSONALIZED, SECURE, AND INTUITIVE SMART HOME CONTROL USING A SMART HAND

(71) Applicant: Samsung Electronics Co., Ltd., Suwon-si, Gyeonggi-do (KR)

(72) Inventor: Zhiyun Li, Kenmore, WA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1029 days.

(21) Appl. No.: 14/530,472

(22) Filed: Oct. 31, 2014

(65) Prior Publication Data

US 2016/0124401 A1    May 5, 2016

(51) Int. Cl.
*G05B 15/02* (2006.01)
*G08C 17/02* (2006.01)
*H04L 12/28* (2006.01)

(52) U.S. Cl.
CPC .............. *G05B 15/02* (2013.01); *G08C 17/02* (2013.01); *H04L 12/2803* (2013.01); *G08C 2201/71* (2013.01); *G08C 2201/93* (2013.01)

(58) Field of Classification Search
CPC ....................................................... G05B 15/02
USPC .................................................. 700/275–306
See application file for complete search history.

(56) References Cited

U.S. PATENT DOCUMENTS

| | | | | |
|---|---|---|---|---|
| 8,594,850 B1 * | 11/2013 | Gourlay | ................. | G05B 15/02 165/11.1 |
| 2010/0217452 A1 * | 8/2010 | McCord | ................. | G06Q 50/06 700/295 |
| 2013/0184874 A1 * | 7/2013 | Frader-Thompson | ....................... | F24F 11/0001 700/276 |
| 2013/0297087 A1 * | 11/2013 | Koster | ..................... | H04Q 9/00 700/291 |
| 2014/0003369 A1 * | 1/2014 | Josiam | ............... | H04W 72/0406 370/329 |
| 2014/0018971 A1 * | 1/2014 | Ellis | ....................... | G06Q 10/04 700/297 |

(Continued)

FOREIGN PATENT DOCUMENTS

EP    2343942    7/2011

OTHER PUBLICATIONS

Han, Dae-Man, and Jae-Hyun Lim. "Smart home energy management system using IEEE 802.15. 4 and zigbee." IEEE Transactions on Consumer Electronics 56.3 (2010). pp. 1403-1410.*

(Continued)

*Primary Examiner* — Satish Rampuria (57) ABSTRACT

A user equipment (UE) for use in a smart home control system is provided. The UE includes a beam forming device configured to transmit a directional signal beam to an electronic device. The directional signal beam includes a credential associated with the UE. The UE also includes a transmitter configured to transmit a command signal including the credential after the beam forming device transmits the directional signal beam to the electronic device. The command signal commands an operation of the electronic device. The UE further includes an input device. The input device is configured to receive a directional signal beam generating input to initiate the transmission of the signal beam. The input device is also configured to receive a command input to initiate the transmission of the command signal.

21 Claims, 6 Drawing Sheets

(56) References Cited

U.S. PATENT DOCUMENTS

| | | | |
|---|---|---|---|
| 2014/0177607 A1 | 6/2014 | Li et al. | |
| 2014/0277788 A1* | 9/2014 | Forbes, Jr. | G05F 1/66 700/286 |
| 2014/0277795 A1* | 9/2014 | Matsuoka | G06Q 30/0202 700/291 |
| 2015/0100167 A1* | 4/2015 | Sloo | F24F 11/30 700/278 |
| 2015/0276266 A1* | 10/2015 | Warren | H04W 4/70 700/300 |
| 2015/0293511 A1* | 10/2015 | Laufer | G08B 7/06 700/275 |

OTHER PUBLICATIONS

Zhang, Lan, Henry Leung, and Keith CC Chan. "Information fusion based smart home control system and its application." IEEE Transactions on Consumer Electronics 54.3 (2008). pp. 1157-1165.*

Han, Dae-Man, and Jae-Hyun Lim. "Design and implementation of smart home energy management systems based on zigbee." IEEE Transactions on Consumer Electronics 56.3 (2010). pp. 1417-1425.*

Extended European Search Report issued for EP 15191765.5 dated Apr. 26, 2016, 7 pgs.

* cited by examiner

METHOD AND SYSTEM FOR PERSONALIZED, SECURE, AND INTUITIVE SMART HOME CONTROL USING A SMART HAND

TECHNICAL FIELD

The present application relates generally to smart home control systems and, more specifically, to a personalized and secure control of electronic devices using a smart home control system.

BACKGROUND

Smart home control systems are used to regulate and control thermostats, lighting, security systems, electronics, and the like within or around a home or building. Components in a smart home control system can be set to particular settings. The components of a smart home control system can be set to particular settings using control devices such as a computer, wall mount, switches, dials, handheld devices, or the like. However, such control devices lack personalized control, are unsecure, or are inconvenient to use.

SUMMARY

In a first embodiment, a user equipment (UE) for use in a smart home control system is provided. The UE includes a beam forming device configured to transmit a directional signal beam to an electronic device. The directional signal beam includes a credential associated with the UE. The UE also includes a transmitter configured to transmit a command signal including the credential after the beam forming device transmits the directional signal beam to the electronic device. The command signal commands an operation of the electronic device. The UE further includes an input device. The input device is configured to receive a directional signal beam generating input to initiate the transmission of the signal beam. The input device is also configured to receive a command input to initiate the transmission of the command signal.

In a second embodiment, a smart home control system is provided. The smart home control system includes an electronic device. The smart home control system also includes a user equipment (UE). The UE is configured to transmit a directional signal beam to the electronic device. The directional signal beam includes a credential associated with the UE. The UE is also configured to transmit a command signal including the credential after transmitting the directional signal beam to the electronic device. The command signal commands an operation of the electronic device. The smart home control system further includes a central hub. The central hub is configured to receive a signal from the electronic device including the credential and a signal source indication associated with the electronic device. The central hub is also configured to receive the command signal including the credential. The central hub is further configured to associate the command signal with the electronic device based on the credential. The central hub is configured to transmit the command signal to the electronic device.

In a third embodiment, a central hub (hub) of a smart home control system is provided. The hub includes a transceiver. The transceiver is configured to receive a signal from an electronic device including a credential associated with a user equipment (UE) and a signal source indication associated with the electronic device. The transceiver is also configured to receive a command signal from the UE. The command signal includes the credential. The transceiver is further configured to transmit the command signal to the electronic device. The hub also includes a processor. The processor is configured to associate the command signal with the electronic device based on the credential in order to determine that the command signal is to be transmitted to the electronic device.

In a fourth embodiment, a method for use in a central hub (hub) of a smart home control system is provided. The method includes receiving a signal from an electronic device including a credential associated with a user equipment (UE) and a signal source indication associated with the electronic device. The method also includes receiving a command signal from the UE. The command signal includes the credential. The method further includes associating the command signal with the electronic device based on the credential. The method includes determining that the command signal is to be transmitted to the electronic device based on associating the command signal with the electronic device. The method also includes transmitting the command signal to the electronic device.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device or system.

Figure 1:
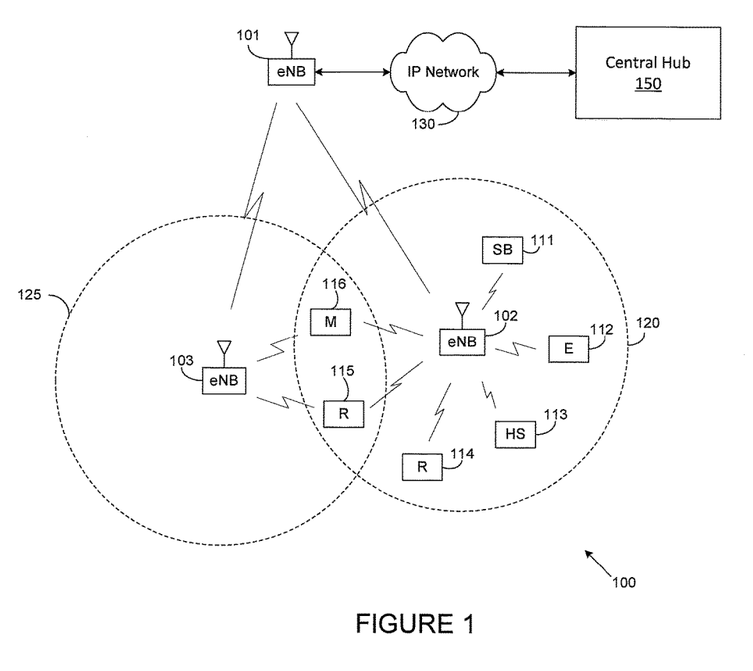
FIG. 1 illustrates an example wireless network according to this disclosure.

FIG. 1 illustrates an example wireless network 100 according to this disclosure. The embodiment of the wireless network 100 shown in FIG. 1 is for illustration only. Other embodiments of the wireless network 100 could be used without departing from the scope of this disclosure.

As shown in FIG. 1, the wireless network 100 includes an eNodeB (eNB) 101, an eNB 102, and an eNB 103. The eNB 101 communicates with the eNB 102 and the eNB 103. The eNB 101 also communicates with at least one Internet Protocol (IP) network 130, such as the Internet, a proprietary IP network, or other data network.

Depending on the network type, other well-known terms may be used instead of "eNodeB" or "eNB," such as "base station" or "access point." For the sake of convenience, the terms "eNodeB" and "eNB" are used in this patent document to refer to network infrastructure components that provide wireless access to remote terminals. Also, depending on the network type, other well-known terms may be used instead of "user equipment" or "UE," such as "mobile station," "subscriber station," "remote terminal," "wireless terminal," or "user device." For the sake of convenience, the terms "user equipment" and "UE" are used in this patent document to refer to remote wireless equipment that wirelessly accesses an eNB, whether the UE is a mobile device (such as a mobile telephone or smartphone) or is normally considered a stationary device (such as a desktop computer or vending machine).

The eNB 102 provides wireless broadband access to the network 130 for a first plurality of user equipments (UEs) within a coverage area 120 of the eNB 102. The network 130 can provide access to a central hub 150 for use in a smart home control system as discussed herein. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, or the like. The eNB 103 provides wireless broadband access to the network 130 for a second plurality of UEs within a coverage area 125 of the eNB 103. The second plurality of UEs includes the UE 115 and the UE 116. In some embodiments, one or more of the eNBs 101-103 may communicate with each other and with the UEs 111-116 using 3G/4G, LTE, LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, a UE, such as a handset, a wrist watch, or a wrist watch communicatively linked to a handset, transmits commands for an electronic device in a smart home control system using a central hub 150. An electronic device, such as a television, receives authenticated commands from a UE for electronic device operation. For example, a first UE can transmit credentials for UE authentication. A central hub 150 communicating with the television set identifies and authenticates the first UE using the credentials so that the first UE has permission to command the television using certain operations. Authentication of the credentials provides permission for a UE to command an electronic device using certain operations. If the central hub 150 is not able to authenticate the credentials of the first UE, then no commands provided by the first UE are sent to the television.

An electronic device, such as a television, also receives UE specific commands for electronic device operation. For example, a first UE can transmit a command for a television set which turns on the television set. After authenticating the first UE, the central hub 150 communicating with the television set identifies the first UE and transmits a command based on the first UE to turn on the television set. For example, the central hub 150 can transmit a command to turn on the television based on the first UE so that when the television is turned on, the volume has a predetermined volume level and a predetermine channel is displayed. Conversely, if the central hub 150 identifies and authenticates a second UE transmitting a command to turn on the television set, the central hub 150 can transmit a command to turn on the television set based on the second UE. For example, the central hub 150 can transmit a command to turn on the television based on the second UE so that the volume has a different volume level from the predetermined volume level of the first UE and a channel that is displayed is different from the predetermined channel that is displayed when receiving a command associated with the first UE.

Although FIG. 1 illustrates one example of a wireless network 100, various changes may be made to FIG. 1. For example, the wireless network 100 could include any number of eNBs and any number of UEs in any suitable arrangement. Also, the eNB 101 could communicate directly with any number of UEs and provide those UEs with wireless broadband access to the network 130. Similarly, each eNB 102-103 could communicate directly with the network 130 and provide UEs with direct wireless broadband access to the network 130. Further, the eNB 101, 102, and/or 103 could provide access to other or additional external networks, such as external telephone networks or other types of data networks.

Figure 2A:
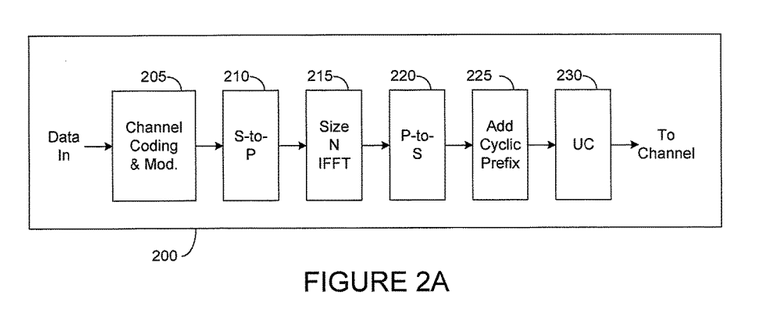
FIGS. 2A and 2B illustrate example wireless transmit and receive paths according to this disclosure.
Figure 2B:
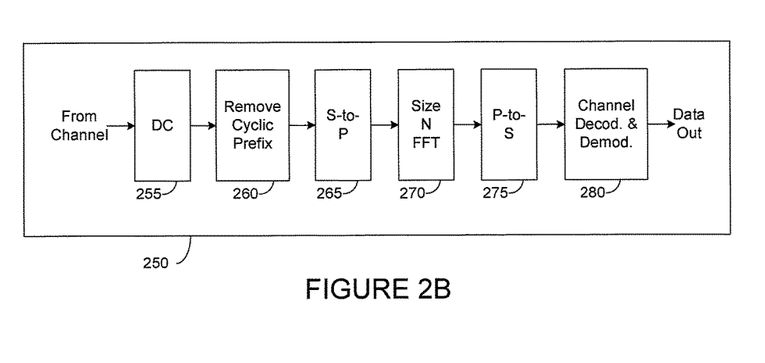

FIGS. 2A and 2B illustrate example wireless transmit and receive paths according to this disclosure. In the following description, a transmit path 200 may be described as being implemented in an eNB (such as eNB 102), while a receive path 250 may be described as being implemented in a UE (such as UE 116). However, it will be understood that the receive path 250 could be implemented in an eNB and that the transmit path 200 could be implemented in a UE. In some embodiments, the transmit path 200 and receive path 250 are configured to communicate UE credentials from a UE and from electronic devices as well as communicate UE specific commands to the electronic devices in a smart home control system.

The transmit path 200 includes a channel coding and modulation block 205, a serial-to-parallel (S-to-P) block 210, a size N Inverse Fast Fourier Transform (IFFT) block 215, a parallel-to-serial (P-to-S) block 220, an add cyclic prefix block 225, and an up-converter (UC) 230. The receive path 250 includes a down-converter (DC) 255, a remove cyclic prefix block 260, a serial-to-parallel (S-to-P) block 265, a size N Fast Fourier Transform (FFT) block 270, a parallel-to-serial (P-to-S) block 275, and a channel decoding and demodulation block 280.

In the transmit path 200, the channel coding and modulation block 205 receives a set of information bits, applies coding (such as a low-density parity check (LDPC) coding), and modulates the input bits (such as with Quadrature Phase Shift Keying (QPSK) or Quadrature Amplitude Modulation (QAM)) to generate a sequence of frequency-domain modulation symbols. The serial-to-parallel block 210 converts (such as de-multiplexes) the serial modulated symbols to parallel data in order to generate N parallel data streams, where N is the IFFT/FFT size used in the eNB 102 and the UE 116. The size N IFFT block 215 performs an IFFT operation on the N parallel symbol streams to generate time-domain output signals. The parallel-to-serial block 220 converts (such as multiplexes) the parallel time-domain output symbols from the size N IFFT block 215 in order to generate a serial time-domain signal. The add cyclic prefix block 225 inserts a cyclic prefix to the time-domain signal. The up-converter 230 modulates (such as up-converts) the output of the add cyclic prefix block 225 to an RF frequency for transmission via a wireless channel. The signal may also be filtered at baseband before conversion to the RF frequency.

A transmitted RF signal from the eNB 102 arrives at the UE 116 after passing through the wireless channel, and reverse operations to those at the eNB 102 are performed at the UE 116. The down-converter 255 down-converts the received signal to a baseband frequency, and the remove cyclic prefix block 260 removes the cyclic prefix to generate a serial time-domain baseband signal. The serial-to-parallel block 265 converts the time-domain baseband signal to parallel time domain signals. The size N FFT block 270 performs an FFT algorithm to generate N parallel frequency-domain signals. The parallel-to-serial block 275 converts the parallel frequency-domain signals to a sequence of modulated data symbols. The channel decoding and demodulation block 280 demodulates and decodes the modulated symbols to recover the original input data stream.

Each of the eNBs 101-103 may implement a transmit path 200 that is analogous to transmitting in the downlink to UEs 111-116 and may implement a receive path 250 that is analogous to receiving in the uplink from UEs 111-116. Similarly, each of UEs 111-116 may implement a transmit path 200 for transmitting in the uplink to eNBs 101-103 and may implement a receive path 250 for receiving in the downlink from eNBs 101-103.

Each of the components in FIGS. 2A and 2B can be implemented using only hardware or using a combination of hardware and software/firmware. As a particular example, at least some of the components in FIGS. 2A and 2B may be implemented in software, while other components may be implemented by configurable hardware or a mixture of software and configurable hardware. For instance, the FFT block 270 and the IFFT block 215 may be implemented as configurable software algorithms, where the value of size N may be modified according to the implementation.

Furthermore, although described as using FFT and IFFT, this is by way of illustration only and should not be construed to limit the scope of this disclosure. Other types of transforms, such as Discrete Fourier Transform (DFT) and Inverse Discrete Fourier Transform (IDFT) functions, could be used. It will be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIGS. 2A and 2B illustrate examples of wireless transmit and receive paths, various changes may be made to FIGS. 2A and 2B. For example, various components in FIGS. 2A and 2B could be combined, further subdivided, or omitted and additional components could be added according to particular needs. Also, FIGS. 2A and 2B are meant to illustrate examples of the types of transmit and receive paths that could be used in a wireless network. Any other suitable architecture could be used to support wireless communications in a wireless network.

Figure 3:
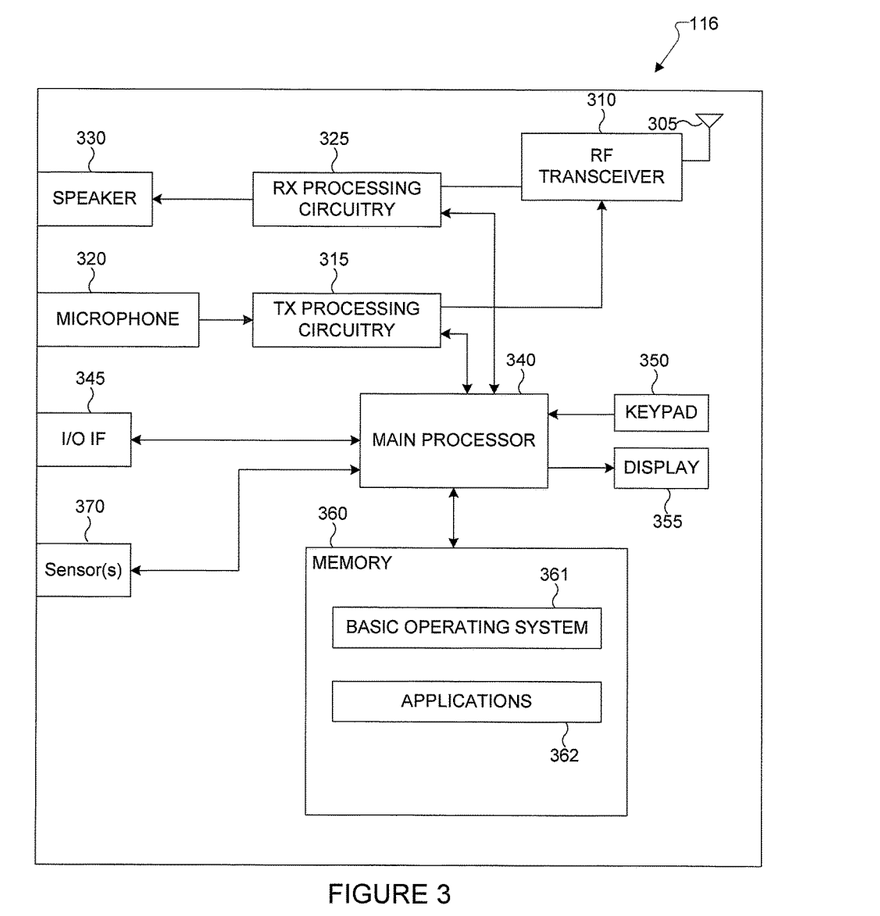
FIG. 3 illustrates an example user equipment (UE) according to this disclosure.

FIG. 3 illustrates an example UE 116 according to this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, a keypad 350, a display 355, a memory 360, and one or more sensors 370. The memory 360 includes a basic operating system (OS) program 361 and one or more applications 362.

The RF transceiver 310 receives, from the antenna 305, an incoming RF signal transmitted by an eNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360, such as operations for generating UE credentials to be transmitted to a central hub 150 and for generating commands for an electronic device to be transmitted to the central hub 150. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also communicatively linked (such as coupled) to the I/O interface 345, which provides the UE 116 with the ability to connect to other devices such as laptop computers and handheld computers. The I/O interface 345 is the communication path between these accessories and the main controller 340. For example, the I/O interface 345 includes a beam forming device (such as narrow beam infrared (IR) emitter) configured to transmit a directional signal beam to an electronic device as discussed herein.

The main processor 340 is also coupled to the keypad 350 and the display unit 355. The operator of the UE 116 can use the keypad 350 to enter data into the UE 116. The display 355 may be a liquid crystal display or other display capable of rendering text and/or at least limited graphics, such as from web sites.

The memory 360 is coupled to the main processor 340. Part of the memory 360 could include a random access memory (RAM), and another part of the memory 360 could include a Flash memory or other read-only memory (ROM).

The one or more sensors 370 are communicatively linked (such as coupled) to the main processor 340. The one or more sensors 370 can include a muscle contraction sensor for identifying a hand, finger, or body movement. For example, the one or more sensors 370 can be attached to a person's wrist in the form of a smart watch. Upon a movement of one or more fingers, the sensors 370 can detect the movement and transmit the signal to the main processor 340. The one or more sensors 370 can also include an accelerometer. For example, the one or more sensors 370 can be attached to a person's wrist in the form of a smart watch or can be included in a mobile phone or handset. Upon a particular movement of the smart watch or mobile phone, the accelerometer can detect the movement and transmit the signal to the main processor 340.

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices such as a smart watch, a smart wrist watch, smart glasses, a tablet device, or the like.

Figure 4:
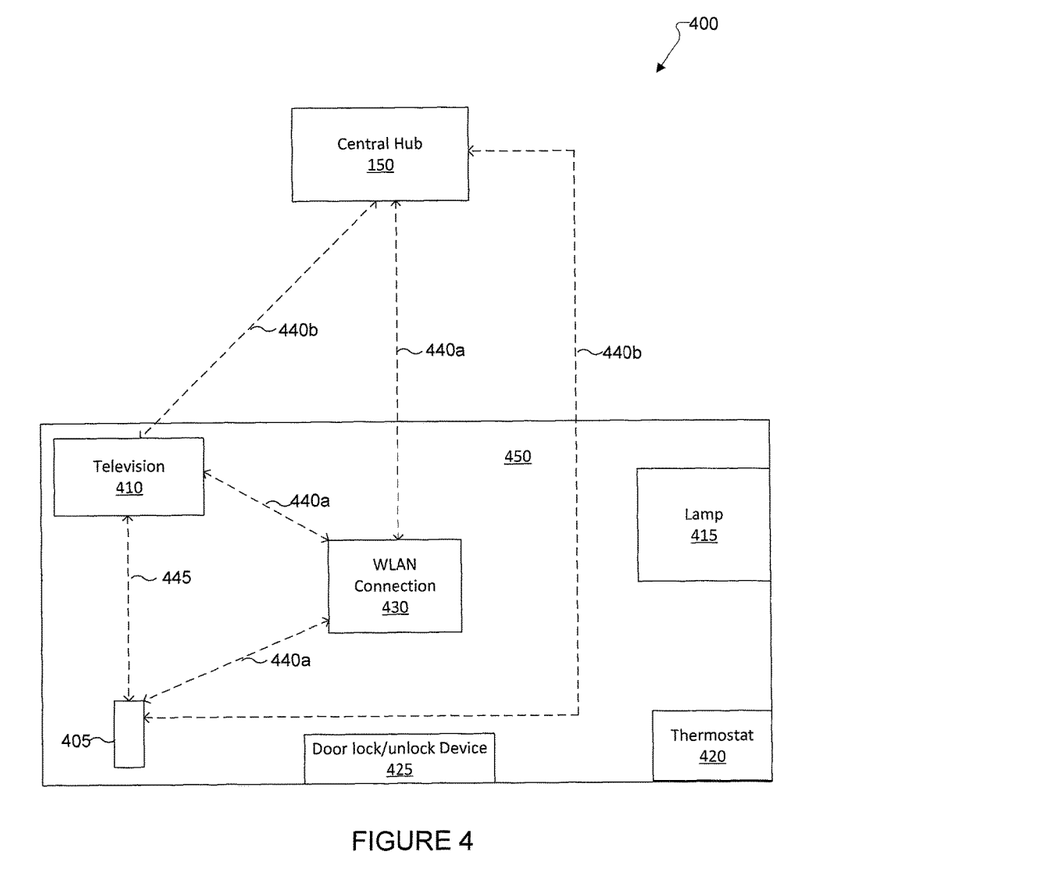
FIG. 4 illustrates an example smart home control system according to this disclosure.

FIG. 4 illustrates an example smart home control system 400 according to this disclosure. The embodiment of the smart home control system 400 illustrated in FIG. 4 is for illustration only. The components illustrated in FIGS. 1 through 3 could be implemented as components of the smart home control system 400 illustrated in FIG. 4. However, smart home control systems come in a wide variety of configurations, and FIG. 4 does not limit the scope of this disclosure to any particular implementation of a smart home control system. For example, a smart home control system 400 can include scenarios where there are multiple electronic devices to control in a space, such as in buildings, ships, vehicles, areas of land, or the like.

As shown in FIG. 4, the smart home control system 400 includes a smart watch 405, one or more electronic devices, such as a television 410, a lamp 415, a thermostat 420, a door lock/unlock device 425, and a WLAN connection 430 in or around a home or building 450. In certain embodiments, the smart watch 405 can include the same components and functionality as the UE 116. In certain embodiments, the smart watch 405 includes processing circuitry to couple to the UE 116. The smart home control system 400 also includes the central hub 150. The UE 116 and the electronic devices are communicatively linked to the central hub 150 via the WLAN connection 430 and one or more wired or wireless channels 440a. The UE 116 and the electronic devices can also be communicatively linked to the central hub 150 via a wireless communication system as illustrated in FIG. 1 and one or more wireless channels 440b.

A control device, such as a wearable device is configured to transmit a beam 445 pointing to an electronic device. For example, the UE 116 can be a wearable device such as the smart watch 405. In certain embodiments, the wearable device can be communicatively linked to mobile phone for transmitting and receiving signals as well as data and voice communication. A user wearing the smart watch 405 points the beam 445 at the television 410 (such as at a beam receiving point on the television 410) to initiate a command sequence to command the television 410 to perform an operation. While the example wearable device provided herein is the smart watch 405, the wearable device can be a mobile phone, a tablet, smart glasses or any wearable device, a combination thereof, or the like. An electronic device can include a television, a radio, a computer, a media player, a light or lighting system, an electronic door locking/unlocking device, an electronic window locking/unlocking device, a heating system, a ventilation system, an air conditioning system, a mobile phone, a tablet, any combination thereof, or the like. It should be understood that by pointing the beam 445 and the television 410, the smart watch 405 initiates a command sequence to command only the television 410 to perform an operation. In other words, the beam 445 may not be wide enough to initiate a command sequence with the television 410 as well as the lamp 415, the thermostat 420, and/or the door lock/unlock device 425. Additionally, the smart watch 116 does not transmit a plurality of beams to initiate command sequences with the television 410 as well as the lamp 415, the thermostat 420, and/or the door lock/unlock device 425. To initiate a command sequence with the lamp 415, the thermostat 420, the door lock/unlock device 425, or any other electronic device, the smart watch 405 directs the beam 445 at those electronic devices.

As previously discussed, the smart watch 405 is configured to transmit a beam 445 to an electronic device to initiate a command sequence to command the electronic device to perform an operation. The smart watch 405 is configured to transmit UE specific credentials to the electronic device using the beam 445. For example, the smart watch 405 is a first wearable smart watch of a first user. The first smart watch 405 transmits a beam 445 to the television 410. The beam 445 includes credentials identifying the first smart watch 405. The credentials can be unique only to the first smart watch 405. Upon receiving the beam 445 including the credentials, the television 410 transmits a signal including the credentials of the first smart watch 405 to the central hub 150.

The signal also includes a signal source indication indicating that the signal with the credentials received by the central hub 150 is transmitted from the television 410. The central hub 150 receives the credentials and signal source indication of the signal and associates the credentials and the signal source indication with each other. The central hub 150 stores the associated credentials and signal source indication. As discussed further herein, the credentials provide an indication for the central hub 150 to be ready to receive a command originating from the first smart watch 405. The signal source indication paired with the credentials informs the central hub 150 that when the central hub 150 receives a command originating from the first smart watch 405 the command is to be transmitted to the television 410 to command the television 410 to perform an operation.

The central hub 150 also uses the credentials to authenticate the first smart watch 405. For example, only particular UEs including the first smart watch 405 can be authorized to command particular electronic devices such as the television 410 to perform particular operations. When the central hub 150 receives the signal including the credentials and the signal source indication, the central hub 150 can process the credentials and the signal source indication to determine if the first smart watch 405 is authorized to command the television 410 to perform an operation. If the central hub 150 does not authenticate the credentials with the signal source indication, then, when the central hub 150 subsequently receives a command with the credentials originating from the first smart watch 116, the central hub 150 may not transmit the command to the television 410. If the central hub 150 does authenticate the credentials with the signal source indication, then, when the central hub 150 subsequently receives a command with the credentials originating from the smart watch 405, the central hub 150 transmits the command to the television 410.

The central hub 150 authenticates credentials of UEs so that only predetermined or registered UEs can command particular electronic devices with particular operations. For example, while a first smart watch 405 with its own unique credentials is authenticated to originate a command to command an operation of the television 410, the lamp 415, the thermostat 420, and the door lock/unlock device 425, a second smart watch with its own unique credentials may only be authorized to command an operation of the lamp 415. Furthermore, a third smart watch with its own unique credentials may not be registered and thus is not authenticated to command an operation of any of the television 410, the lamp 415, the thermostat 420, and the door lock/unlock device 425. A UE registration with a central hub 150 can be password protected to prevent unwanted UEs from gaining authentication to command particular electronic devices in a smart home control system.

In certain embodiments, the central hub 150 associates credentials with one or more settings of a particular electronic device or credentials with a history of a particular electronic device. In an embodiment, credentials of a first smart watch 405 when received by a central hub 150 in conjunction with a signal source indication indicating a television 410 can identify particular setting of the first smart watch 405 for using the television 410. For example, when a first smart watch 405 transmits a command to turn on a television 410, the central hub 150 can match the credentials of the first smart watch 405 with a setting for a low television volume and a setting for a particular broadcast channel when the television is turned on. Subsequently, when the television 410 is turned on, the volume is projected at the low volume and the particular broadcast channel is displayed on the television. Conversely, when a second smart watch 405 transmits a command to turn on the same television 410, the central hub 150 can match the credentials of the second smart watch with a setting for a high television volume and a setting for a different broadcast channel from the first smart watch when the television is turned on. Subsequently, when the television 410 is turned on, the volume is projected at the high volume and the different broadcast channel is displayed on the television. The credentials of each smart watch 405 can be associated with unique settings for each type of electronic device.

In an embodiment, credentials of a first smart watch 405 when received by a central hub 150 in conjunction with a signal source indication indicating a television 410 can identify particular setting of the first smart watch 405 for using the television 410 based on a history of television use associated with the credentials. For example, when a first smart watch 405 transmits a command to turn on a television 410, the central hub 150 can match the credentials of the first smart watch 405 with settings identifying that when the credentials of the first smart watch 405 is received at the current time with a command to turn on the television, that the television should be turned on in order to display a broadcast channel that is normally or was previously displayed at a same time of day and/or at a same day of the week as the current time. Subsequently, when the television 410 is turned on, the volume is projected at the low volume and the particular broadcast channel is displayed on the television.

After the smart watch 405 transmits a beam 445 with credentials to the television 410 and the television 410 transmits the credentials and a signal source indication to the central hub 150, the smart watch 405 receives a command input. In certain embodiment, the smart watch 405 includes a sensor that detects a muscle movement. For example, the smart watch 405 wrapped around the wrist of a user can detect the movement of one or more fingers. In another example, smart glasses (when UE 116 is configured as smart glasses) can detect the blinking of an eye or particular eye blinking patterns. In yet another example, the smart watch 405 can receive an input through a touch screen interface or one or more input buttons. In yet another example, the smart watch 405 can receive a voice input through a microphone. In yet another example, the smart watch 405 can receive a gesture input through motion sensors.

Depending upon the electronic device to be commanded and the particular input received by the smart watch 405, the smart watch 405 transmits a particular command signal to the central hub 150. The smart watch 405 transmits a command signal to the central hub 150 through the channel 440a via the WLAN connection 430, directly using the channel 440b, or via the beam 445 and television 410. For example, the central hub 150 receives a command from the smart watch 405 indicating that a sensor has detected that user has made a fist. The command also includes the credential of the smart watch 405. After the central hub 150 receives the command indicating that a sensor has detected that user has made a fist and including the credential of the smart watch 405, the central hub 150 determines that the command is to be directed to the television 410 by matching the credential received from the television 410 including the signal source indication with the credential received from the command signal. The central hub 150 also determines if the credentials have been authenticated and if any specific settings are associated with the credentials and the television.

The central hub 150 also examines the command signal and determines what operation command is to be sent to the television 410. For example, if a sensor on the smart watch 405 senses that a user has made a fist, the central hub 150 examines that the command signal is a fist and determines that a fist command signal that is directed for a television indicates that the television is to be turned on. Conversely, if a fist command signal is directed to a thermostat 420, the central hub 150 determines that the thermostat set point is to be decreased by five degrees. Thus, the same command input detected by the smart watch 405 can command different electronic devices to perform different operations depending on the specific electronic device.

Once the central hub 150 determines the operation to be performed by an electronic device, the central hub 150 transmits an operation command signal to the specified electronic device. It should be noted that the last electronic device to transit the credentials of a smart watch 405 will be the electronic device that receives the operation command signal. For example, the smart watch 405 transmits a beam 445 with credentials to the lamp 415 and then transmits another beam 445 with the credential to the television 410. Subsequently, the smart watch 405 transmits a command message and credentials to the central hub 150. The central hub 150 directs an operation command to the television 410, but not the lamp 415 because the television was the last device to receive the beam 445 and transmit the credentials of the smart watch 405 with the signal source indication to the central hub 150.

As previously discussed, the central hub 150 transmits an operation command signal to a specified electronic device so that the electronic device performs a specific operation. Operations can include turning on and off a television, changing a channel or a volume setting of a television, unlocking or locking a window or door, turning on or off a light or a lighting system, adjusting a thermostat, or the like.

Figure 5:
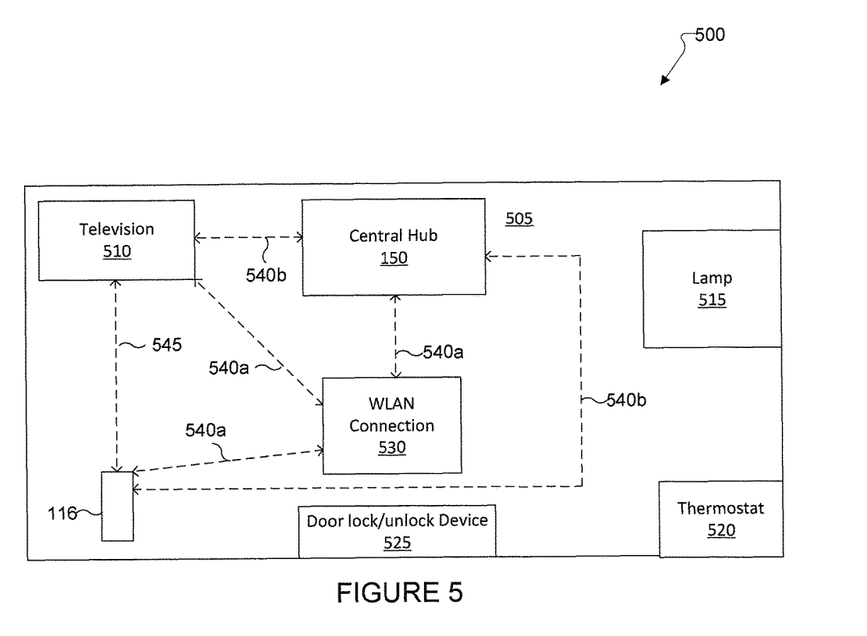
FIG. 5 illustrates another example smart home control system according to this disclosure.

FIG. 5 illustrates another example smart home control system 500 according to this disclosure. The embodiment of the smart home control system 500 illustrated in FIG. 5 is for illustration only, and the smart home control system illustrated in FIG. 4 could have the same or similar configuration. However, smart home control systems come in a wide variety of configurations, and FIG. 5 does not limit the scope of this disclosure to any particular implementation of a smart home control system.

As shown in FIG. 5, the smart home control system 500 includes a building 505, a UE 116, one or more electronic devices such as a television 510, a lamp 515, a thermostat 520, a door lock/unlock device 525, a WLAN connection 530, and a central hub 150. Similar to FIG. 4, the UE 116 can transmit a credential to an electronic device using a beam 545. Also similar to FIG. 4, the UE 116 and the electronic devices can communicate with the central hub 150 via channels 540a and the WLAN connection 530. Furthermore, FIG. 5 also illustrates that the central hub 150 is located in the building 505. Accordingly, the UE 116 and the electronic devices can communicate with the central hub 150 via short-distance communication channels 540b. Short-distance communication channels can include BLUETOOTH, ZigBee, Z-wave, or the like.

Figure 6:
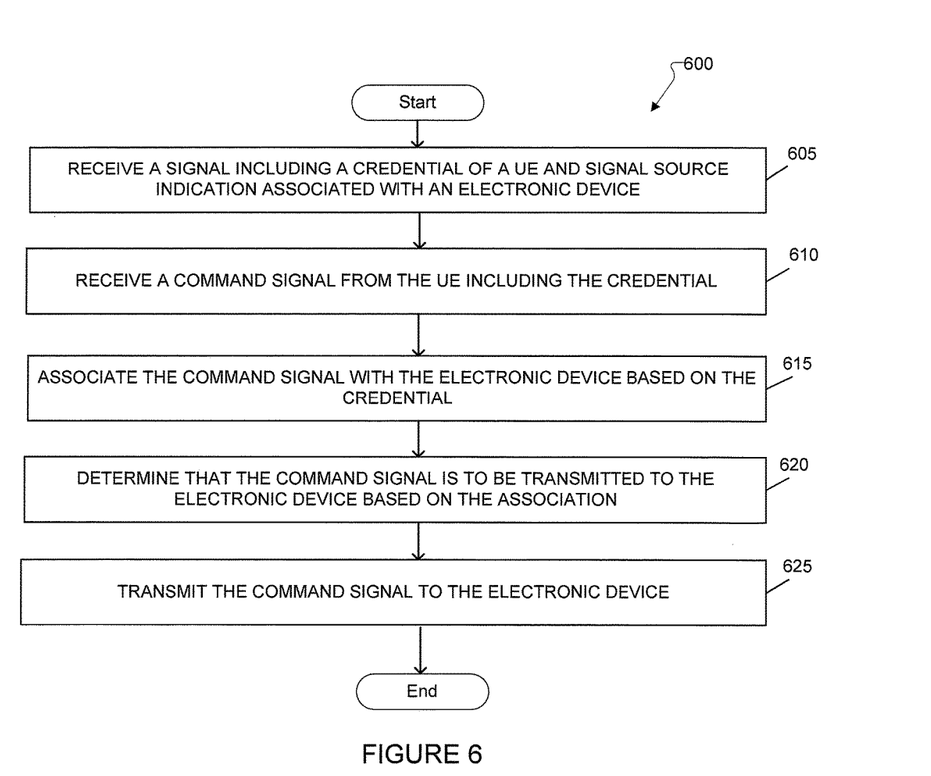
FIG. 6 is a flow diagram illustrating an example method in a smart home control system according to this disclosure.

FIG. 6 is a flow diagram illustrating an example method 600 for use in a central hub 150 of a smart home control system 400 or 500 according to this disclosure. While the flow chart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. The process depicted in the example depicted is implemented by a transmitter chain in, for example, a, UE such as UE 116.

At step 605, the central hub receives a signal from an electronic device including a credential associated with a user equipment (UE) and a signal source indication associated with the electronic device. Receiving the signal from the electronic device can include receiving the signal from the electronic device using a cellular network, a Wireless Local Area Network (WLAN) connection, or other short-distance communication channels.

At step 610, the central hub receives a command signal from the UE, wherein the command signal includes the credential. Receiving the command signal from the UE can include receiving the signal from the electronic device using a cellular network, a WLAN connection, or other short-distance communication channels. At step 615, the central hub associates the command signal with the electronic device based on the credential. At step 620, the central hub determines that the command signal is to be transmitted to the electronic device based on associating the command signal with the electronic device. At step 625, the central hub transmits the command signal to the electronic device. Transmitting the command signal to the electronic device can include receiving the signal from the electronic device using a cellular network, a WLAN connection, or other short-distance communication channels.

Although various features have been shown in the figures and described above, various changes may be made to the figures. For example, the size, shape, arrangement, and layout of components shown in FIGS. 1 through 5 are for illustration only. Each component could have any suitable size, shape, and dimensions, and multiple components could have any suitable arrangement and layout. Also, various components in FIGS. 1 through 5 could be combined, further subdivided, or omitted and additional components could be added according to particular needs. Further, each component in a device or system could be implemented using any suitable structure(s) for performing the described function(s). In addition, while FIG. 6 illustrates various series of steps, various steps in FIG. 6 could overlap, occur in parallel, occur multiple times, or occur in a different order.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A user equipment (UE) for use in a smart home control system, the UE comprising:
   a processor configured to receive an input to initiate a transmission of a directional signal beam;
   a narrow beam forming device configured to transmit the directional signal beam to an electronic device, wherein:
   the directional signal beam includes a credential unique to the UE, and
   the credential is used to authenticate the UE as authorized to control the electronic device,
   a transceiver coupled to the processor, wherein the processor is further configured to receive, after the UE is authenticated as authorized based on the credential, a command input to initiate the transmission of a command signal, wherein the transceiver is configured to transmit the command signal after the narrow beam forming device transmits the directional signal beam to the electronic device, and wherein the command signal commands an operation of the electronic device.

2. The UE of claim 1, wherein the command input comprises at least one of a voice command, a sensing of a UE movement, a sensing of a muscle movement, a sensing of a touch input, or a sensing of an eye movement.

3. The UE of claim 1, wherein the credential is authenticated before an operation command signal is sent to command an operation of the electronic device.

4. A smart home control system comprising:
an electronic device;
a user equipment (UE) configured to:
transmit a directional signal beam to the electronic device, wherein:
the directional signal beam includes a credential unique to the UE, and
the credential is used to authenticate the UE as authorized to control the electronic device,
transmit a command signal after transmitting the directional signal beam to the electronic device, wherein the command signal commands an operation of the electronic device; and
a central hub configured to:
receive a signal from the electronic device including the credential and a signal source indication associated with the electronic device,
authenticate the UE, using the credential, as authorized to control the electronic device,
receive the command signal including the credential,
associate the command signal with the electronic device based on the authenticated credential, and
transmit the command signal to the electronic device.

5. The smart home control system of claim 4, wherein the electronic device is configured to transmit the credential and the signal source indication to the central hub in response to receiving the directional signal beam from the UE.

6. The smart home control system of claim 4, wherein the UE is configured to transmit the command signal to the central hub using at least one of a cellular network, a wireless local area network (WLAN) connection or any other short-distance communication channels.

7. The smart home control system of claim 4, wherein the UE is configured to transmit the command signal to the central hub using at least one of a cellular network, a wireless local area network (WLAN) connection, or any other short-distance communication channels.

8. The smart home control system of claim 4, wherein the central hub is further configured to:
load personal settings, related to the electronic device, based on the credential, and
transmit the personal settings, with the command signal, to the electronic device.

9. The smart home control system of claim 4, wherein the central hub is configured to authenticate the credential with a list of approved credentials to determine whether the central hub is permitted, based on the credential, to transmit the command signal to the electronic device.

10. A central hub (hub) of a smart home control system, the hub comprising:

a transceiver, and
a processor configured to:
control the transceiver to receive a signal from an electronic device including
(i) a credential unique to a user equipment (UE), the credential received from the UE on directional signal beam, and
(ii) a signal source indication associated with the electronic device,
authenticate, using the credential, the UE as authorized to control the electronic device,
control the transceiver to receive a command signal from the UE, wherein the command signal commands an operation of the electronic device;
associate the command signal with the electronic device based on the authenticated credential, and
control the transceiver to transmit the command signal to the electronic device.

11. The hub of claim 10, wherein the transceiver is configured to receive the signal from the electronic device, receive the command signal from the UE, and transmit the command signal to the electronic device using a cellular network.

12. The hub of claim 10, wherein the transceiver is configured to receive the signal from the electronic device, receive the command signal from the UE, and transmit the command signal to the electronic device using wired or wireless short-distance communications.

13. The hub of claim 10, wherein the processor is configured to associate the command signal with the electronic device based on the credential by matching the credential of the signal received from the electronic device with the credential of the command signal received from the UE.

14. The hub of claim 10, wherein the processor is further configured to:
load personal settings related to the electronic device based on the credential and
transmit the personal settings, with the command signal, to the electronic device.

15. The hub of claim 10, wherein the processor is further configured to authenticate the credential with a list of approved credentials to determine whether the hub is permitted, based on the credential, to transmit the command signal to the electronic device.

16. A method for use in a central hub (hub) of a smart home control system, the method comprising:
receiving a signal from an electronic device including
(i) a credential unique to a user equipment (UE), the credential received from the UE on directional signal beam, and
(ii) a signal source indication associated with the electronic device;
authenticating, using the credential, the UE as authorized to control the electronic device,
receiving a command signal from the UE, wherein the command signal includes the credential and commands an operation of the electronic device;
associating the command signal with the electronic device based on the authenticated credential;
determining that the command signal is to be transmitted to the electronic device based on associating the command signal with the electronic device; and
transmitting the command signal to the electronic device.

17. The method of claim 16, wherein:
receiving the signal from the electronic device comprises receiving the signal from the electronic device using a cellular network, receiving the command signal from the UE comprises receiving the command signal from the UE using the cellular network, and transmitting the command signal to the electronic device comprises transmitting the command signal to the electronic device using the cellular network.

18. The method of claim 16, wherein:

receiving the signal from the electronic device comprises receiving the signal from the electronic device using short-distance communication channels, receiving the command signal from the UE comprises receiving the command signal from the UE using short-distance communication channels, and transmitting the command signal to the electronic device comprises transmitting the command signal to the electronic device using short-distance communication channels.

19. The method of claim 16, wherein associating the command signal with the electronic device based on the credential comprises matching the credential of the signal received from the electronic device with the credential of the command signal received from the UE.

20. The method of claim 16, further comprising loading personal settings related to the electronic device, based on the credential, and transmitting the personal settings, with the command signal, to the electronic device.

21. The method of claim 16, further comprising authenticating the credential with a list of approved credentials to determine whether the hub is permitted, based on the credential, to transmit the command signal to the electronic device.

* * * * *